United States Patent Office 3,632,591
Patented Jan. 4, 1972

3,632,591
1,2,3,4,5,6 - HEXAHYDRO-3-(CYCLOALIPHATIC OR CYCLOALIPHATIC ALKYL)-6,11-DIMETHYL-2,6-METHANO-3-BENZAZOCINES
Noel F. Albertson, East Greenbush, and Sydney Archer, Bethlehem, N.Y., assignors to Sterling Drug Inc., New York, N.Y.
No Drawing. Filed July 19, 1968, Ser. No. 745,992
Int. Cl. C07d 39/00
U.S. Cl. 260—293.54
12 Claims

ABSTRACT OF THE DISCLOSURE 1,2,3,4,5,6 - hexahydro-3-($Y^1$)-8-($Y^2$)-6,11-dimethyl-2,6-methano-3-benzazocines wherein $Y^1$ is 2- or 3-cyclopentenyl, lower alkyl-(2 or 3 - cyclopentenyl), cyclopentenylmethyl, (lower alkyl - cyclopentenyl)methyl, cyclopentyl, or lower alkyl-cyclopentyl, which are antagonists of strong analgesics, are obtained by introducing the $Y^1$ group into the corresponding 3-(H) compounds.

This invention relates to compositions of matter classified in the art of chemistry as 1,2,3,4,5,6-hexahydro-2,6-methano-3-benzazocines and to the preparation of the same.

The invention sought to be patented resides in one composition aspect in the concept of the novel chemical compounds designated as 1,2,3,4,5,6-hexahydro-3-($Y^1$)-8-($Y^2$)-6,11-dimethyl-2,6-methano - 3 - benzazocines having in the free base form the formula

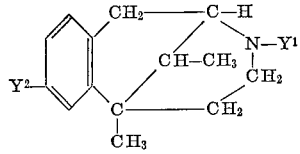

Formula I wherein: $Y^1$ is 2- or 3-cyclopentenyl, lower alkyl-(2- or 3-cyclopentenyl), cyclopentylmethyl, (lower alkyl-cyclopentenyl)methyl, cyclopentyl, or lower alkyl-cyclopentyl; and $Y^2$ is hydrogen, alkyl containing 1–4 carbon atoms, halo, trifluoromethyl, hydroxy, alkoxy containing 1–4 carbon atoms, methoxymethoxy, trihalomethoxy, alkanoyloxy containing 1–12 carbon atoms, cycloalkanecarbonyloxy containing 4–8 carbon atoms, pyridinecarbonyloxy, nitro, amino, alkanoylamino containing 1–12 carbon atoms, cycloalkanecarbonylamino containing 4–8 carbon atoms, pyridinecarbonylamino, or alkanesulfonamido containing 1–12 carbon atoms.

These compounds are useful as antagonists of strong analgesics such as morphine and meperidine.

The invention sought to be patented resides, in its process aspect, in the concept of the process which comprises interacting 1,2,3,4,5,6-hexahydro-8-($Y^2$)-6,11-dimethyl-2,6-methano-3-benzazocine having the formula

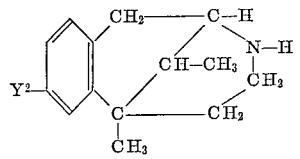

Formula II with an agent having the formula $Y^1$-An in the presence of an acid-absorbing medium, wherein An is the anion of a strong organic or inorganic acid and $Y^1$ and $Y^2$ have the same significance indicated hereinabove in Formula I.

When $Y^1$ is cyclopentenyl there are included 2-cyclopentenyl and 3-cyclopentenyl, and when $Y^1$ is cyclopentenylmethyl there are included 1-cyclopentenylmethyl, 2-cyclopentenylmethyl, and 3-cyclopentenylmethyl. When cyclopentenyl, cyclopentenylmethyl, or cyclopentenyl contains lower alkyl, the total number of carbons in lower alkyl is 1–4 and is contained in one, two, three or four alkyl groups. Thus when $Y^1$ is lower alkyl-(2- or 3-cyclopentenyl) there are included for example 2-methyl-2-cyclopentenyl, 2,2-dimethyl-3-cyclopentenyl, 5-ethyl-2-cyclopentenyl, 4-butlyl-2-cyclopentenyl, 2,3-dimethyl-3-cyclopentenyl, 2,2,5,5 - tetramethyl-3-cyclopentenyl, and the like. When $Y^1$ is cyclopentenylmethyl, there are included for example (2-methyl-2-cyclopentenyl)methyl, (2-butyl-3-cyclopentenyl)methyl, (2 - methyl-1-cyclopentenyl)methyl, (2,3-diethyl-1-cyclopentenyl)methyl, 2,2,5,5-tetramethyl-3-cyclopentenyl)methyl, and the like. When $Y^1$ is lower alkyl-cyclopentyl, there are included for example 2-methylcyclopentyl, 3-methylcyclopentyl, 2-butylcyclopentyl, 2,5-diethylcyclopentyl, 3-propylcyclopentyl, 2,2,4,4-tetramethylcyclopentyl, and the like.

When $Y^2$ is lower alkyl there are included for example methyl, ethyl, n-propyl, isopropyl, n-butyl, isobutyl, and the like. When $Y^2$ is halo there are included chlorine, bromine, fluorine, and iodine. When $Y^2$ is lower alkoxy there are included for example methoxy, ethoxy, propoxy, isopropoxy, t-butoxy, and the like. When $Y^2$ is trihalomethoxy there are included trichloromethoxy and trifluoromethoxy. When $Y^2$ is lower alkanoyloxy there are included for example formoxy, acetoxy, propionoxy, isovaleroxy, dodecanoyloxy, and the like. When $Y^2$ is cycloalkanecarbonyloxy there are included for example cyclopropanecarbonyloxy, cyclobutanecarbonyloxy, cyclohexanecarbonyloxy, 1 - methylcyclohexanecarbonyloxy, and the like. When $Y^2$ is pyridinecarbonyloxy there are included 2-pyridinecarbonyloxy, 3-pyridinecarbonyloxy, and 4-pyridinecarbonyloxy. When $Y^2$ is alkanoylamino there are included for example formamido, acetamido, propionamido, isovaleramido, heptanoylamino, dodecanoylamino, and the like. When $Y^2$ is cycloalkanecarbonylamino there are included for example cyclopentanecarbonylamino, cyclobutanecarbonylamino, cyclopentanecarbonylamino, cyclohexanecarbonylamino, and the like. When $Y^2$ is pyridinecarbonylamino there are included 2-pyridinecarbonylamino, 3-pyridinecarbonylamino, and 4-pyridinecarbonylamino. When $Y^2$ is lower alkanesulfonamido there are included for example methanesulfonamido, ethanesulfonamido, hexanesulfonamido, octanesulfonamido, undecanesulfonamido, and the like.

Due to the presence of the basic amino grouping, the free base forms represented by Formula I above react with organic and inorganic acids to form acid-addition salts. The acid-addition salt forms are prepared from any organic or inorganic acid. They are obtained in conventional fashion, for instance either by direct mixing of the base with the acid or when this is not appropriate, by dissolving either or both of the base and the acid separately in water or an organic solvent and mixing the two solutions, or by dissolving both the base and the acid together in a solvent. The resulting acid-addition salt is isolated by filtration, if it is insoluble in the reaction medium, or by evaporation of the reaction medium to leave the acid-addition salt as a residue. The acid moieties or anions in these salt forms are in themselves neither novel nor critical and therefore can be any acid anion or acid-like substance capable of salt formation with the base.

Representative acids for the formation of the acid-addition salts include formic acid, acetic acid, isobutyric acid, alpha-mercaptopropionic acid, trifluoroacetic acid, malic acid, fumaric acid, succinic acid, succinmanic acid, tannic acid, glutamic acid, tartaric acid, oxalic acid, pyromucic acid, citric acid, lactic acid, glycolic acid gluconic acid, saccharic acid, ascorbic acid, penicillin, benzoic acid, phthalic acid, salicyclic acid, 3,5-dinitrobenzoic acid, anthranilic acid, cholic acid, 2-pyridinecarboxylic acid, pamoic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, arsenic acid, and the like.

All of the acid-addition salts are useful as sources of the free base form, by reaction with an inorganic base. It will thus be appreciated that if one or more of the characteristics, such as solubility, molecular weight, physical appearance, toxicity, or the like of a given base or acid-addition salt thereof render that form unsuitable for the purpose at hand, it can be readily converted to another, more suitable form. For pharmaceutical purposes, acid-addition salts of relatively non-toxic, pharmaceutically-acceptable acids, for example hydrochloric acid, lactic acid, tartaric acid, and the like, are of course employed.

The 1,2,3,4,5,6 - hexahydro - 3 - ($Y^1$)-8-($Y^2$)-6,11-dimethyl-2,6-methano-3-benzazocines of this invention can exist in stereochemically isomeric forms, that is, optical isomers and geometric isomers. If desired, the isolation or the production of a particular stereochemical form can be accomplished by application of the general principles known in the prior art.

The manner and process of making and using the invention, and the best mode contemplated by the inventors of carrying out this invention, will now be described so as to enable any person skilled in the art to which it pertains to make and use the same.

The 1,2,3,4,5,6 - hexahydro - 3 - ($Y^1$)-8-($Y^2$)-6,11-dimethyl-2,6-methano-3-benzazocines of this invention are obtained from the corresponding nor-bases of Formula II hereinabove by N-alkylating the nor-base with an alkylating agent having the formula $Y^1$—An, wherein $Y^1$ has the same significance indicated in Formula I and An is the anion of a strong organic or inorganic acid, for instance a reactive halide or an arylsulfonate, e.g. a methylbenzenesulfonate, in the presence of an acid-absorbing medium, for instance an alkali metal carbonate or bicarbonate, e.g. sodium bicarbonate. This reaction is conveniently carried out in a suitable inert solvent, for example N,N-dimethylformamide.

In addition to preparation by the direct alkylation method described above, it will be appreciated that certain of the 1,2,3,4,5,6 - hexahydro-3-($Y^1$)-8-($Y^2$)-6,11-di-methyl-2,6-methano-3-benzazocines of this invention can be obtained from other species of the final products, using chemical reactions well-known generally in the chemical art, as illustrated by the following procedures.

The species of Formula I wherein $Y^2$ is alkoxy can be obtained by etherification of the corresponding compounds of Formula I wherein $Y^2$ is hydroxy. Or, on the other hand, the species of Formula I wherein $Y^2$ is hydroxy can be obtained by cleaving the corresponding alkoxy species with a suitable agent such as concentrated hydrobromic acid. By esterifying the 8-hydroxy compounds of Formula I in conventional fashion for esterification of phenols by treatment with a suitable O-alkanoylating or O-cycloalkanecarbonylating or O - pyridinecarbonylating agent, for instance the appropriate acid anhydride or acid chloride, there are obtained the species or Formula I where $Y^2$ is alkanoyloxy or cycloalkanecarbonyloxy or pyridinecarbonyloxy respectively. Alternatively, if desired, the 8-acyloxy compounds of Formula I are readily hydrolyzed to the corresponding hydroxy compounds.

The 8-(methoxymethoxy) compounds of Formula I can alternatively be obtained by interacting chloromethyl methyl ether with the sodio or other suitable metallo derivative of the corresponding 8-hydroxy compounds of Formula I.

The species of Formula I wherein $Y^2$ is nitro are alternatively obtained by nitrating the corresponding species wherein $Y^2$ is hydrogen. By reducing these nitro compounds, for instance with zinc or iron and acetic acid, to the corresponding amino compounds and, if desired, N-acylating the latter with the appropriate alkanoylating, cycloalkanecarbonylating, pyridinecarbonylating, or alkanesulfonylating agents, there are obtained the species of Formula I wherein $Y^2$ is alkanoylamino, cycloalkanecarbonylamino, pyridinecarbonylamino, or alkanesulfonamido, respectively. For preparation of the acylamino compounds, direct reductive acylation of the nitro compounds is sometimes preferable.

The species of Formula I wherein $Y^2$ is trihalomethoxy are alternatively prepared by halogenating the corresponding 8-methoxy compounds of Formula I. If desired, the trifluoromethoxy compounds are produced from the trichloromethoxy compounds by halogen exchange in conventional fashion.

The 1,2,3,4,5,6 - hexahydro - 8 - ($Y^2$)-6,11-dimethyl-2,6 - methano - 3 - benzazocines employed as starting materials in the preparation of the compounds of Formula I hereinabove are a known class of compounds, and all of the specis of this class of nor-bases required for practice of the processes of the instant invention are either known or readily derived from the old species by obvious and conventional chemical ractions. For instance, 1,2,3,4,5,6-hexahydro - 3 - methyl - 8 - nitro-6,11,dimethyl-2,6-methano - 3 - benzazocine is readily N-demethylated in known manner to yield 1,2,3,4,5,6 - hexahydro - 8 - nitro-6,11 - dimethyl - 2,6 - methano - 3 - benzazocine which by reduction with zinc and acetic acid yields 1,2,3,4,5,6-hexahydro - 8 - amino - 6,11 - dimethyl-2,6 - methano-3-benzazocine. If desired, this product is readily acylated, in the form of its monohydrochloride, with an appropriate N - alkanoylating, N-cycloalkanecarbonylating, N-pyridinecarbonylating, or N-alkanesulfonylating agent; using this procedure, N-acylation at the 3-position is minimized and the chief acylation product is the corresponding 1,2,3,4,5,6 - hexahydro - 8 - acylamino-6,11-dimethyl-2,6-methano-3-benzazocine.

The 1,2,3,4,5,6 - hexahydro - 3 - ($Y^1$)-8-($Y^2$)-6,11-dimethyl-2,6-methano-3 - benzazocines of this invention can be administered parenterally or orally in any of the conventional pharmaceutical forms, as for instance solutions, suspensions, tablets, capsules, and the like.

The structures of the compounds of this invention were established by the modes of synthesis, by elementary analysis, and by ultraviolet, infrared, and nuclear magnetic resonance spectra. The course of the reactions and homogeneity of the products were ascertained by thin layer chromatography.

The invention is illustrated by the following examples without, however, being limited thereto.

EXAMPLE 1

(A) A mixture of 14.4 g. of 1,2,3,4,5,6 - hexahydro-8 - hydroxy - cis - 6,11 - dimethyl - 2,6 - methano-3-benzazocine, 10.5 g. of 2-cyclopentenyl bromide, 7.8 g. of sodium bicarbonate and 120 ml. of N,N-dimethylformamide was refluxed with stirring for 4 hours. The reaction mixture was concentrated under reduced pressure, isopropyl alcohol was added to the residue thus obtained and the mixture was filtered. The filtrate was charcoaled and filtered and the filtrate was concentrated under reduced pressure to yield 23 g. of black oil. This oil was partitioned between diethyl ether and dilute hydrochloric acid. The acidic aqueous layer was separated, charcoaled, and filtered. The filtrate was made basic by addition of a large excess of ammonium hydroxide. The supernatant liquid was decanted from the semisolid precipitate which formed, and this semisolid product was partitioned between dilute ammonium hydroxide and ethyl acetate. The ethyl acetate layer was separated, dried, and concentrated under reduced pressure to yield 9.5 g. of brown oil. To this oil, which partially crystallized on standing, there was added a small volume of ethyl acetate, and the mixture was filtered. There was thus obtained 5.0 g. of solid which melted at 168–190° C. This product was chromatographed on a silica column treated with a small volume of isopropyl alcohol, using a mixture of (by volume) 94% chloroform, 3% methyl alcohol and 3% isopropyl alcohol. The third and fourth fractions were combined and dried to yield 1.7 g. of solid which melted at 175–199° C. This product was recrystallized twice from a mixture of isopropyl alcohol and methyl alcohol to yield 1.2 g. of 1,2,3,4,5,6-hexahydro-3-(2-cyclopentenyl)-8 - hydroxy-cis - 6,11 - dimethyl - 2,6 - methano - 3-benzazocine as a white crystalline solid which melted at 195.0–199.8° C. (corr.).

(B) The 1,2,3,4,5,6 - hexahydro - 3-(2-cyclopentenyl)-8 - hydroxy-cis - 6,11 - dimethyl - 2,6 - methano - 3-benzazocine obtained as described above in part A is readily O-acylated by any suitable procedure for O-acylating phenols. We ordinarily prefer the following mixed anhydride procedure. The appropriate acid is mixed with one equivalent of isobutyl chloroformate in triethylamine and acetone at −10° C. and after the mixture has stood for ten minutes at this temperature there is added one equivalent of 1,2,3,4,5,6 - hexahydro - 3 - (2-cyclopentenyl) - 8 - hydroxy-cis - 6,11 - dimethyl-2,6-methano - 3 - benzazocine, thus resulting in the formation of the desired 8-acyloxy compound. For example when the acid is acetic acid, dodecanoic acid, cyclopropanecarboxylic acid, cyclohexanecarboxylic acid, or nicotinic acid, the respective O-acylation products are 1,2,3,4,5,6 - hexahydro - 3 - (2 - cyclopentenyl) - 8-acetoxy-cis - 6,11 - dimethyl-2,6-methano-3-benzazocine, 1,2,3,4,5,6 - hexahydro - 3 - (2-cyclopentenyl) - 8-dodecanoyloxy-cis - 6,11 - dimethyl - 2,6 - methano - 3-benzazocine, 1,2,3,4,5,6 - hexahydro-3-(2-cyclopentenyl)-8 - cyclopropanecarbonyloxy-cis - 6,11 - dimethyl - 2,6-methano - 3 - benzazocine, 1,2,3,4,5,6 - hexahydro-3-(2 - cyclopentenyl) - 8 - cyclohexanecarbonyloxy-cis-6,11-dimethyl - 2,6 - methano - 3 - benzazocine, and 1,2,3,4,5,6-hexahydro - 3 - (2 - cyclopentenyl) - 8-nicotinoyloxy-cis-6,11 - dimethyl - 2,6 - methano - 3 - benzazocine.

EXAMPLE 2

Following a procedure similar to that described above in Example 1(A), but using 3-cyclopentenyl bromide instead of 2 - cyclopentenyl bromide, there is obtained 1,2,3,4,5,6 - hexahydro - 3 - (3-cyclopentenyl) - 8-hydroxy-cis - 6,11 - dimethyl - 2,6 - methano - 3-benzazocine.

EXAMPLE 3

Following a procedure similar to that described above in Example 1(A), but using 1,2,3,4,5,6 - hexahydro-cis-6,11 - dimethyl 1 2,6 - methano - 3 - benzazocine, 1,2,3,4,5,6 - hexahydro - 8 - methyl-cis - 6,11 - dimethyl-2,6-methano - 3 - benzazocine, and 1,2,3,4,5,6-hexahydro-8-nitro-cis-6,11 - dimethyl-2,6-methano-3-benzazocine instead of 1,2,3,4,5,6 - hexahydro - 8-hydroxy-cis-6,11-dimethyl-2,6-methano-3-benzazocine, there was obtained the respective products 1,2,3,4,5,6 - hexahydro - 3 - (2-cyclopentenyl) - cis - 6,11 - dimethyl - 2,6 - methano-3-benzazocine, 1,2,3,4,5,6 - hexahydro - 3-(2-cyclopentenyl)-8 - methyl-cis - 6,11 - dimethyl - 2,6 - methano-3-benzazocine, and 1,2,3,4,5,6 - hexahydro - 3 - (2-cyclopentenyl) - 8 - nitro-cis-6,11-dimethyl - 2,6-methano-3-benzazocine. Reduction of the 1,2,3,4,5,6 - hexahydro-3-(2-cyclopentenyl) - 8 - nitro-cis - 6,11 - dimethyl-2,6-methano-3-benzazocine with zinc and acetic acid yields 1,2,3,4,5,6 - hexahydro - 3 - (2 - cyclopentenyl(-8-amino-cis-6,11 - dimethyl - 2,6 - methano-3-benzazocine. N-acylation of this 8-amino compound in the presence of pyridine with acetyl chloride, with dodecanoyl chloride, with cyclopropanecarbonyl chloride, with nicotinoyl chloride, and with decanesulfonyl chloride yields the respective products 1,2,3,4,5,6-hexahydro-3-(2-cyclopentenyl)-8-acetamido-cis-6,11-dimethyl-2,6-methano-3-benzazocine, 1,2,3,4,6-hexahydro-3-(2-cyclopentenyl)-8-dodecanoyl-amino-cis-6,11-dimethyl-2,6-methano-3-benzazocine, 1,2,3,4,5,6-hexahydro-3,(2-cyclopentenyl)-8-cyclopropanecarbonylamino-cis-6,11-dimethyl-2,6-methano-3-benzazocine, 1,2,3,4,5,6-hexahydro-3-(2-cyclopentenyl)-8-nicotinoylamido-cis-6,11-dimethyl-2,6-methano-3-benzazocine, and 1,2,3,4,5,6-hexahydro-3-(2-cyclopentenyl)-8-decanesulfonamido-cis-6,11-dimethyl-2,6-methano-3-benzazocine.

EXAMPLE 4

Following a procedure similar to that described above in Example 1(A) but using 1,2,3,4,5,6 - hexahydro-8-chloro-cis-6,11 - dimethyl-2,6 - methano-3-benzazocine, 1,2,3,4,5,6 - hexahydro - 8 - bromo-cis-6,11 - dimethyl-2,6-methano - 3 - benzazocine, 1,2,3,4,5,6-hexahydro-8-iodo-cis-6,11 - dimethyl - 2,6 - methano-3-benzazocine and 1,2,3,4,5,6 - hexahydro - 8 - fluoro-cis-6,11-dimethyl-2,6-methano-3-benzazocine instead of the corresponding 8-hydroxy compound there are obtained the respective products 1,2,3,4,5,6-hexahydro-3-(2-cyclopentenyl(-8-chloro-cis-6,11-dimethyl-2,6-methano-3-benzazocine, 1,2,3,4,5,6-hexahydro-3-(2-cyclopentenyl)-8-bromo-cis-6,11-dimethyl-2,6-methano-3-benzazocine, 1,2,3,4,5,6-hexahydro-3-(2-cyclopentenyl)-8-iodo-cis-6,11-dimethyl-2,6-methano-3-benzazocine, and 1,2,3,4,5,6-hexahydro-3-(2-cyclopentenyl)-8-fluoro-cis-6,11-dimethyl-2,6-methano-3-benzazocine.

EXAMPLE 5

Following a procedure similar to that described above in Example 1(A) but using 1,2,3,4,5,6 - hexahydro-8-methoxy-cis-6,11 - dimethyl-2,6-methano-3-benzazocine and 1,2,3,4,5,6 - hexahydro 8 - isobutoxy-cis-6,11 - dimethyl - 2,6 - methano - 3 - benzazocine instead of the corresponding 8-hydroxy compound, there are obtained the respective products 1,2,3,4,5,6 - hexahydro - 3-(2-cyclopentenyl)-8-methoxy-cis - 6,11 - dimethyl - 2,6-methano-3-benzazocine and 1,2,3,4,5,6 - hexahydro-3-(2-cyclopentenyl) - 8 - isobutoxy-cis - 6,11 - dimethyl-2,6-methano-benzazocine.

EXAMPLE 6

Following a procedure similar to that described above in Example 1(A) but using 1,2,3,4,5,6 - hexahydro-8-trifluoro-methyl-cis - 6,11 - dimethyl - 2,6 - methano-3-benzazocine instead of 1,2,3,4,5,6-hexahydro-8-hydroxy-cis-6,11 - dimethyl - 2,6-methano-3-benzazocine, there is obtained 1,2,3,4,5,6 - hexahydro - 3-(2-cyclopentenyl-8-trifluoromethyl-cis - 6,11 - dimethyl - 2,6 - methane-3-benzazocine.

EXAMPLE 7

Following a procedure similar to that described above in Example 1(A) but using 1,2,3,4,5,6 - hexahydro-8-methoxymethoxy-cis - 6,11 - dimethyl - 2,6 - methano-3-benzazocine instead of 1,2,3,4,5,6 - hexahydro - 8-hydroxy-cis - 6,11-dimethyl-2,6-methano-3-benzazocine and 2-methyl-2-cyclopentenyl bromide instead of 2-cyclopentenyl bromide there is obtained 1,2,3,4,5,6-hexahydro-3-(2-methyl -2 - cyclopentenyl) - 8-methoxymethoxy-cis-6,11-dimethyl-2,6-methano-3-benzazocine.

EXAMPLE 8

Following a procedure similar to that described above in Example 1(A) but using 1,2,3,4,5,6-hexahydro-8-trifluoromethoxy - cis - 6,11 - dimethyl - 2,6 - methano-3-benzazocine instead of 1,2,3,4,5,6-hexahydro-8-hydroxycis-6,11 - dimethyl - 2,6-methano-3-benzazocine and 2,2,5,5-tetramethyl-3 - cyclopentenyl bromide instead of 2-cyclopentenyl bromide there is obtained 1,2,3,4,5,6-hexahydro-3-(2,2,5,5 - tetramethyl - 3-cyclopentenyl)-8-trifluoromethoxy-cis - 6,11 - dimethyl - 2,6 - methano-3-benzazocine.

EXAMPLE 9

Following a procedure similar to that described above in Example 1(A) but using 1,2,3,4,5,6 - hexahydro-8-methanesulfonamido-cis-6,11 - dimethyl - 2,6 - methano-3-benzazocine instead of 1,2,3,4,5,6 - hexahydro-8-hydroxy-cis-6,11 - dimethyl - 2,6 - methano-3-benzazocine, there is obtained 1,2,3,4,5,6 - hexahydro-3-(2-cyclopentenyl)-8-methanesulfonamide-cis - 6,11 - dimethyl - 2,6-methano-3-benzazocine.

EXAMPLE 10

(A) A mixture of 21.7 g. of 1,2,3,4,5,6-hexahydro-8-hydroxy - cis - 6,11 - dimethyl - 2,6 - methano - 3-benzazocine, 16.1 g. of (1 - cyclopentenyl)methyl bromide, 14 g. of sodium bicarbonate, and 225 ml. of dimethylformamide was refluxed and stirred for three hours. The reaction mixture was filtered and the filtrate was evaporated under reduced pressure. Diethyl ether and water were added to the residue thus obtained and the mixture was filtered to remove an amorphous black precipitate. The aqueous and ethereal layers of the filtrate were separated, and water containing 10 ml. of hydrochloric acid was added to the ethereal layer. The brown ether was separated from the syrup which precipitated from solution, the syrup was mixed with ammonium hydroxide, and the mixture was extracted with diethyl ether. The ether extract was dried, charcoaled, and filtered, and the filtrate was concentrated under reduced pressure to yield 25.0 g. of 1,2,3,4,5,6-hexahydro-3-[(1-cyclopentenyl)methyl] - 8 - hydroxy-cis-6,11-dimethyl-2,6-methano-3-benzazocine as a syrup. This base was converted to the hydrochloride by treatment with ethereal hydrogen chloride solution. There was thus obtained 25.8 g. of the hydrochloride as a white crystalline solid which melted at 256.0–257.0° C. (dec.) (corr.).

(B) When the procedure of part (A) is repeated but using 1,2,3,4,5,6 - hexahydro-cis-6,11-dimethyl-2,6-methano-3 - benzazocine instead of 1,2,3,4,5,6 - hexahydro - 8 - hydroxy - cis-6,11-dimethyl-2,6-methano-3-benzazocine, the reaction product is 1,2,3,4,5,6 - hexahydro-3-[(1-cyclopentenyl)methyl] - cis-6,11-dimethyl-2,6-methano-3-benzazocine.

(C) When 1,2,3,4,5,6 - hexahydro-3-[(1-cyclopentyl)methyl] - 8 - hydroxy - cis-6,11-dimethyl-2,6-methano-3-benzazocine is O-acylated, using in the mixed anhydride procedure described above in Example 1(B) isovaleric acid, heptanoic acid, cyclopentanecarboxylic acid, and 2-pyridinecarboxylic acid, the respective acylation products are 1,2,3,4,5,6-hexahydro-3-[(1-cyclopentenyl)methyl]-8-isovaleroxy-cis-6,11-dimethyl-2,6-methano-3-benzazocine, 1,2,3,4,5,6-hexahydro-3-[(1-cyclopentenyl)methyl]-8-heptanoyloxy-cis-6,11-dimethyl-2,6-methano-3-benzazocine, 1,2,3,4,5,6-hexahydro-3-[(1-cyclopentenyl)methyl]-8-cyclopentanecarbonyloxy-cis-6,11-dimethyl-2,6-methano-3-benzazocine, and 1,2,3,4,5,6-hexahydro-3-[(1-cycloptentenyl)methyl]-8-(2-pyridinecarbonyloxy)-cis-6,11-dimethyl-2,6-methano-3-benzazocine.

EXAMPLE 11

A mixture of 10.0 g. of 1,2,3,4,5,6 - hexahydro-8-hydroxy-trans-6,11-dimethyl-2,6-methano-3-benzazocine, 7.4 g. of (1-cyclopentenyl)methyl bromide, 6.5 g. of sodium bicarbonate and 100 ml. of N,N-dimethylformamide was refluxed for three hours with stirring. The reaction mixture was filtered and the filtrate was evaporated under reduced pressure. Diethyl ether and water were added to the mixture thus obtained and the mixture was filtered to remove an amorphous brown solid. The aqueous and ethereal layers of the filtrate were separated, and the ethereal layer was washed with water, dried, charcoaled, and filtered. The filtrate was concentrated under reduced pressure to yield 13.6 g. of syrup. This product was dissolved in diethyl ether and alcoholic hydrogen chloride was added until the mixture was acid to Congo red. The mixture was filtered to collect 14.0 g. of white crystals which melted at 245–247° C. (dec.). This product was dissolved in 220 ml. of ethyl alcohol and 100 ml. of ether was added to the solution, which was then refrigerated overnight. The mixture was filtered to collect 12.4 g. of 1,2,3,4,5,6 - hexahydro - 3 - [(1-cyclopentenyl)methyl]-8 - hydroxy-trans - 6,11-dimethyl - 2,6 - methano - 3-benzazocine hydrochloride as an off-white crystalline solid which melted at 262.5–263.0° C. (dec.) (corr.).

EXAMPLE 12

Following a procedure similar to that described above in Example 10(A) but using 1,2,3,4,5,6-hexahydro-8-nitro-cis-6,11 - dimethyl-2,6-methano-3-benzazocine instead of 1,2,3,4,5,6 - hexahydro-8-hydroxy-cis-6,11-dimethyl-2,6 - methano-3-benzazocine, there is obtained 1,2,3,4,5,6-hexahydro - 3 - [(1-cyclopentenyl)-methyl]-8-nitro-cis-6,11-dimethyl-2,6-methano-3-benzazocine. Reduction of this 8-nitro product with zinc and acetic acid yields 1,2,3,4,5,6-hexahydro - 3 - [(1-cyclopentenyl)methyl]-8-amino-cis-6,11-dimethyl-2,6-methano-3-benzazocine. N acylation of this 8-amino compound in the presence of pyridine with acetyl chloride, with dodecanoyl chloride, with cyclopropanecarbonyl chloride, with cyclohexanecarbonyl chloride, with nicotinoyl chloride, with methanesulfonyl chloride, and with dodecanesulfonyl chloride yields the respective products 1,2,3,4,5,6-hexahydro-3-[(1-cyclopentenyl)-methyl]-8-acetamido-cis-6,11-dimethyl-2,6-methano-3-benzazocine, 1,2,3,4,5,6-hexahydro-3-[(1-cyclopentenyl)methyl]-8-dodecanoylamino-cis-6,11-dimethyl-2,6-methano-3-benzazocine, 1,2,3,4,5,6-hexahydro-3-[(1-cyclopentenyl)methyl]-8-cyclopropanecarbonylamino-cis-6,11-dimethyl-2,6-methano-3-benzazocine, 1,2,3,4,5,6-hexahydro-3-[(1-cyclopentenyl) methyl]-8-cyclohexanecarbonylamino-cis-6,11-dimethyl-2,6-methano-3-benzazocine, 1,2,3,4,5,6-hexahydro-3-[(1-(cyclopentenyl)methyl]-8-nicotinoylamino-cis-6,11-dimethyl-2,6-methano-3-benzazocine, 1,2,3,4,5,6-hexahydro-3-[1-(cyclopentenyl)methyl]-8-methanesulfonamido-cis-6,11-dimethyl-2,6-methano-3-benzazocine, and 1,2,3,4,5,6-hexahydro-3[(1-cyclopentenyl)methyl]-8-dodecanesulfonamido-cis-6,11-dimethyl-2,6-methano-3-benzazocine.

EXAMPLE 13

(A) To 5.7 g. of 1,2,3,4,5,6-hexahydro-3-[(1-cyclopentenyl)-methyl] - 8-hydroxy-trans-6,11-dimethyl-2,6-methano-3-benzazocine hydrochloride in 50 ml. of hot water there was added 10 ml. of concentrated ammonium hydroxide, and the resulting mixture was chilled. The brown precipitate which formed was collected, dissolved in a mixture of acetone and water, charcoaled, and filtered. Water was added slowly to the filtrate until an oil separated. This oil solidified on standing. After chilling the mixture, it was filtered, and the solid thus collected was washed with water and dried. The product, a red-brown glass which weighed 4.4 g., was dissolved in warm acetic anhydride and the solution was allowed to stand at room temperature for eleven days. The reaction mixture was concentrated under reduced pressure, the residue thus obtained was dissolved in diethyl ether, and the ether solution was filtered to remove a small amount of brown solid. The dark brown filtrate was charcoaled and filtered to yield a yellow filtrate having 1,2,3,4,5,6-hexahydro-3-[(1-cyclo-entenyl)methyl] - 8-acetoxytrans-6,11-dimethyl-2,6,-methano-3-benzazocine dissolved therein This base was treated with ethereal hydrogen chloride solution to yield 5.0 g. of the crude base hydrochloride as a white crystalline solid. This product was recrystallized from methyl alcohol-isopropyl alcohol and then from ethyl alcohol to yield 3.2 g. of 1,2,3,4,5,6-hexahydro-3-[(1-cyclopentenyl)methyl]-8-acetoxy-trans-6,11-dimethyl-2,6-methano-3-benzazocine hydrochloride as a white crystalline solid which melted at 274–278° C.

(B) When the procedure in part (A) above is repeated but using as the starting material 1,2,3,4,5,6-hexahydro-3 - [(1 - cyclopentyl)methyl] - 8 - hydroxy-cis-6,11-dimethyl-2,6-methano-3-benzazocine hydrochloride instead of the trans compound, there is obtained 1,2,3,4,5,6-hexahydro - 3 - [(1 - cyclopentenyl)methyl]-8-acetoxy-cis-6, 11-dimethyl-2,6-methano - 3 - benzazocine hydrochloride.

EXAMPLE 14

A suspension of 18.1 g. of 1,2,3,4,5,6-hexahydro-3-[(1-cyclopentenyl)methyl] - 8 - hydroxy - cis - 6,11-dimethyl-2,6-methano-3-benzazocine hydrochloride and 200 ml. of water was warmed to dissolve the solid, and the solution was filtered to remove a trace of amorphous brown material. To the filtrate there was added 30 ml. of ammonium hydroxide, and the mixture was filtered to collect the precipitate which formed. There was thus obtained 17.7 g. of a brittle tan solid. This solid was taken up in diethyl ether and the solution thus obtained was dried and concentrated under reduced pressure to yield 15.9 g. of 1,2,3,4,5,6 - hexahydro - 3 - [(1-cyclopentenyl)methyl]-8-hydroxy - cis - 6,11 - dimethyl - 2,6-methano-3-benzazocine as a syrup. A mixture of 25.8 g. of N,N,N-trimethyl-N-phenylammonium p-toluenesulfonate in 50 ml. of ethyl alcohol and 1.86 g. of sodium dissolved in 30 ml. of ethyl alcohol was stirred, cooled, and filtered. To the filtrate thus obtained there was added 15.9 g. of 1,2,3,4,5, 6 - hexahydro - 3 - [(1 - cyclopentenyl)methyl]-81hydroxy - cis - 6,11 - dimethyl - 2,6 - methano-3-benzazocine. The mixture thus obtained was warmed on a steam bath for 5 hours, water was added, and N,N-dimethylaniline was removed from the mixture by distillation. Diethyl ether was added to the residue thus obtained and the resulting brown solution was charcoaled and filtered. The ether layer was separated from the aqueous layer in the filtrate washed with concentrated aqueous potassium hydroxide solution and with water, dried, and concentrated under reduced pressure to yield 12.1 g. of yellow syrup. This product, which was crude 1,2,3,4,5,6-hexahydro-3- [(1 - cyclopentenyl)methyl] - 8 - methoxy-cis-6,11-dimethyl - 2,6 - methano - 3 - benzazocine, was treated with ethereal hydrogen chloride to yield 12.8 g. of crude 1,2,3, 4,5,6 - hexahydro - 3 - [(1 - cyclopentenyl)methyl]-8-methoxy - cis - 6,11 - dimethyl-2,6-methano-3-benzazocine hydrochloride as a white crystalline solid which melted at 131–141° C. (dec.). This product was recrystallized twice from acetone to yield 6.23 g. of product which was converted to the free base and chromatographed on a silica column, eluting with ethyl acetate. Fractions 1 (0.45 g.) and 2 (4.15 g.) were converted back to the hydrochloride by treatment with ethereal hydrogen chloride. This hydrochloride was dissolved in 10 ml. of methanol, the resulting solution was filtered, and ether was added to the filtrate. The precipitate which formed was collected on a filter. There was thus obtained 3.4 g. of 1,2,3,4,5,6-hexahydro - 3 - [(1 - cyclopentenyl)methyl] - 8 - methoxy-cis - 6,11 - dimethyl - 2,6-methano-3-benzazocine hydrochloride as a white crystalline solid which melted at 195.0–201.0° C. (dec.)(corr.).

EXAMPLE 15

Following a procedure similar to that described above in Example 10(A), but using (2-cyclopentenyl)methyl bromide instead of (1-cyclopentenyl)methyl bromide, there is obtained 1,2,3,4,5,6-hexahydro-3-[(2-cyclopentenyl)methyl] -8 - hydroxy - cis - 6,11-dimethyl-2,6-methano-3-benzazocine. By treatment of this compound with valeryl chloride in the presence of pyridine, there is obtained 1,2,3,4,5,6 - hexahydro - 3 - [(2 - cyclopentenyl)-methyl - 8 - valeroxy - cis-6,11-dimethyl-2,6-methano-3-benzazocine.

EXAMPLE 16

Following a procedure similar to that described above in Example 10(A) but using 1,2,3,4,5,6 - hexahydro - 8-nitro - cis - 6,11 - dimethyl - 2,6-methane-3-benzazocine instead of 1,2,3,4,5,6 - hexahydro - 8 - hydroxy-cis-6,11-dimethyl-2,6-methano-3-benzazocine, and using (2-cyclopentenyl)methyl bromide instead of (1-cyclo-pentenyl) methyl bromide, there is obtained 1,2,3,4,5,6-hexahydro-3 - [(2 - cyclopentenyl)methyl]-8-nitro-cis-6,11-dimethyl-2,6-methano-3-benzazocine. Reduction of this compound of this compound with zinc and acetic acid yields 1,2,3,4,5,6 - hexahydro - 3 - [(2 - cyclopentenyl)methyl]-8 - amino - cis - 6,11 - dimethyl-2,6-methano-3-benzazocine. N-acylation of this 8-amino compound in the presence of pyridine with isovaleryl chloride, with cyclobutanecarbonyl chloride, with isonicotinoyl chloride, and with 2-ethylhexanesulfonyl chloride yields the respective products 1,2,3,4,5,6-hexahydro-3-[(2-cyclopentenyl)methyl]-8-isovalerylamino-cis-6,11-dimethyl-2,6-methano-3-benzazocine, 1,2,3,4,5,6-hexahydro-3-[(2-cyclopentenyl)methyl]-8-cyclobutanecarbonyl-amino-cis-6,11-dimethyl-3-benzazocine, 1,2,3,4,5,6-hexahydro-3[(2-cyclopentenyl)methyl]-8-isonicotincylamino-cis-6,11-dimethyl-2,6-methano-3-benzazocine, and 1,2,3,4,5,6-hexahydro-3-[2-cyclopentenyl)methyl]-8-(2-ethyl-hexanesulfonamido)-cis-6,11-dimethyl-2,6-methano-3-benzazocine.

EXAMPLE 17

Following a procedure similar to that described above in Example 10(A) but using (3-cyclopentenyl)methyl bromide instead of (1-cyclopentenyl)methyl bromide, there is obtained 1,2,3,4,5,6-hexahydro-3[(3-cyclopentenyl)methyl] - 8 - hydroxy - cis - 6,11 - dimethyl-2,6-methano-3-benzazocine. By treatment of this compound with dodecanoyl chloride in the presence of pyridine, there is obtained 1,2,3,4,5,6 - hexahydro - 3-[(3-cyclopentenyl)-methyl] - 8 - dodecanoyloxy cis - 6,11 - dimethyl - 2,6-methano-3-benzazocine.

EXAMPLE 18

Following a procedure similar to that described above in Example 10(A) by reacting 1,2,3,4,5,6-hexahydro-8-chloro - cis - 6,11 - dimethyl - 2,6-methano-3-benzazocine with (1-cyclopentenyl)methyl bromide there is obtained 1,2,3,4,5,6 - hexahydro - 3 - [(1-cyclopentenyl)methyl]-8-chloro-cis-6,11-dimethyl-2,6-methane-3-benzazocine.

EXAMPLE 19

Following a procedure similar to that described above in Example 10(A) by reacting 1,2,3,4,5,6-hexahydro-8-trifluoromethoxy - cis - 6,11 - dimethyl - 2,6 - methano-3-benzazocine with (1-cyclopentenyl)methyl bromide there is obtained 1,2,3,4,5,6-hexahydro-3-[(1-cyclopentenyl)methyl] - 8 - trifluoromethoxy - cis - 6,11-dimethyl-2,6-methano-3-benzazocine.

EXAMPLE 20

Following a procedure siimlar to that described above in Example 10(A) by reacting 1,2,3,4,5,6-hexahydro-8- trifluoromethyl - cis - 6,11 - dimethyl - 2,6 - methane-3-benzazocine with (1 - cyclopentenyl)methyl bromide, there is obtained 1,2,3,4,5,6 - hexahydro - 3 - [(1-cyclopentenyl)methyl] - 8 - trifluoromethyl-cis-6,11-dimethyl-2,6-methano-3-benzazocine.

EXAMPLE 21

(A) To a solution of 6.5 g. of 1,2,3,4,5,6-hexahydro-8-hydroxy-cis-6,11-dimethyl-2,6-methano-3 - benzazocine in 70 ml. of dimethylformamide there was added 4.2 g. of sodium bicarbonate and 7.3 g. of cyclopentyl p-tosylate (obtained by interacting cyclopentanol with p-toluenesulfonyl chloride in the presence of pyridine) and the resulting mixture was stirred and heated at 70° C. for two hours and thereafter refluxed for one-half hour. The reaction mixture was then concentrated under reduced pressure. The residue thus obtained was taken up in a chloroform-water mixture, and the chloroform layer was separated, washed with water, and concentrated under reduced pressure to yield 8.8 g. of orange-brown syrup. This product was chromatographed on a silica column which had been treated with 60 ml. of ammonium hydroxide and a benzene-methyl alcohol mixture, eluting with a mixture of 200 ml. of methyl alcohol, 800 ml. of benzene, and 10 ml. of 28% ammonium hydroxide. Eluate fractions of 60 ml. and 40 ml. volume each and all thereafter of 20 ml. volume were collected. The first nine fractions were combined and concentrated and the resulting yellow residue was stirred with diethyl ether and the mixture was filtered. There was thus collected 1.3 g. of pale yellow crystals. This product was suspended in 80 ml. of hot acetone, and 23 ml. of ethyl alcohol was added to dissolve the solid. The resulting solution was concentrated until solid began to appear and was then cooled. The solid which precipitated was collected on a filter. There was thus obtained 1.2 g. of 1,2,3,4,5,6-hexahydro - 3 - cyclopentyl-8-hydroxy-cis-6,11-dimethyl-2,6-methano-3-benzazocine as an off-white crystalline solid which melted at 223–226° C. (corr.).

(B) When 1,2,3,4,5,6-hexahydro - 3 - cyclopentyl-8-hydroxy-cis - 6,11 - dimethyl-2,6-methano-3-benzazocine is O-acylated, using in the mixed anhydride procedure described above in Example 1(B) acetic acid, 2,2-dimethylpropanoic acid, cyclopropanecarboxylic acid, cyclohexanecarboxylic acid and nicotinic acid, the respective acylation products are 1,2,3,4,5,6-hexahydro-3-cyclopentyl-8-acetoxy-cis-6,11-dimethyl-2,6-methano-3-benzazocine,
1,2,3,4,5,6-hexahydro-3-cyclopentyl-8-(2,2-dimethylpropanoyloxy)-cis-6,11-dimethyl-2,6-methano-3-benzazocine,
1,2,3,4,5,6-hexahydro-3-cyclopentyl-8-cyclopropanecarbonyloxy-cis-6,11-dimethyl-2,6-methano-3-benzazocine,
1,2,3,4,5,6-hexahydro-3-cyclopentyl-8-cyclohexanecarbonyloxy-cis-6,11-dimethyl-2,6-methano-3-benzazocine, and
1,2,3,4,5,6-hexahydro-3-cyclopentyl-8-nicotinoyloxy-cis-6,11-dimethyl-2,6-methano-3-benzazocine.

EXAMPLE 22

Following a procedure similar to that described above in Example 21, interacting cyclopentyl p-tosylate with 1,2,3,4,5,6-hexahydro - cis - 6,11-dimethyl-2,6-methano-3-benzazocine, with 1,2,3,4,5,6-hexahydro-8-fluoro-cis-6,11-dimethyl-2,6-methano-3-benzazocine, with 1,2,3,4,5,6-hexahydro-8-methyl - cis-6,11-dimethyl-2,6-methano-3-benzazocine, with 1,2,3,4,5,6-hexahydro - 8 - trifluoromethyl-8-cis-6,11-dimethyl - 2,6 - methano-3,-benzazocine, with 1,2,3,4,5,6-hexahydro - 8 - ethoxy-cis-6,11-dimethyl-2,6-methano-3-benzazocine, with 1,2,3,4,5,6-hexahydro-8-trifluoromethoxy - cis - 6,11-dimethyl-2,6-methano-3-benzazocine, and with 1,2,3,4,5,6-hexahydro-8-acetoxy-cis-6,11-dimethyl-2,6-methano-3-benzazocine, yields the respective products 1,2,3,4,5,6-hexahydro-3-cyclopentyl-cis-6,11-dimethyl-2,6-methano-3-benzazocine,
1,2,3,4,5,6-hexahydro-3-cyclopentyl-8-fluoro-cis-6,11-dimethyl-2,6-methano-3-benzazocine,
1,2,3,4,5,6-hexahydro-3-cyclopentyl-8-methyl-cis-6,11-dimethyl-2,6-methano-3-benzazocine,
1,2,3,4,5,6-hexahydro-3-cyclopentyl-8-trifluoromethyl-cis-6,11-dimethyl-2,6-methano-3-benzazocine,
1,2,3,4,5,6-hexahydro-3-cyclopentyl-8-ethoxy-cis-6,11-dimethyl-2,6-methano-3-benzazocine,
1,2,3,4,5,6-hexahydro-3-cyclopentyl-8-trifluoromethoxy-cis-6,11-dimethyl-2,6-methano-3-benzazocine, and
1,2,3,4,5,6-hexahydro-3-cyclopentyl-8-acetoxy-cis-6,11-dimethyl-2,6-methano-3-benzazocine.

EXAMPLE 23

Following a procedure similar to that described above in Example 21(A) by interacting cyclopentyl p-tosylate with 1,2,3,4,5,6 - hexahydro - 8 - nitro-cis-6,11-dimethyl-2,6-methano-3-benzazocine there is obtained 1,2,3,4,5,6-hexahydro - 3 - cyclopentyl-8-nitro-cis-6,11-dimethyl-2,6-methano-3-benzazocine. When this product is reduced with zinc and acetic acid there is obtained 1,2,3,4,5,6-hexahydro - 3 - cyclopentyl-8-amino-cis-6,11-dimethyl-2,6-methano-3-benzazocine. N-acylation of this 8-amino compound in the presence of pyridine with isobutyryl chloride, with cyclopentanecarbonyl chloride, nicotinoyl chloride, and with ethanesulfonyl chloride yields the respective products 1,2,3,4,5,6-hexahydro-3-cyclopentyl-8-isobutyrylamino-cis-6,11-dimethyl-2,6-methano-3-benzazocine,
1,2,3,4,5,6-hexahydro-3-cyclopentyl-8-cyclopentanecarbonylamino-cis-6,11-dimethyl-2,6-methano-3-benzazocine,
1,2,3,4,5,6-hexahydro-3-cyclopentyl-8-nicotinoylamino-cis-6,11-dimethyl-2,6-methano-3-benzazocine, and
1,2,3,4,5,6-hexahydro-3-cyclopentyl-8-ethanesulfonamido-cis-6,11-dimethyl-2,6-methano-3-benzazocine.

As indicated hereinabove, the 1,2,3,4,5,6-hexahydro-3-($Y^1$)-8-($Y^2$)-6,11 - dimethyl - 2,6-methano-3-benzazocines of this invention are useful as antagonists of strong analgesic agents such as meperidine and morphine. Thus, when tested in rats by a modified D'Amour-Smith thermal stimulus test procedure, the compounds of Formula I were found to be antagonists of the analgesic activity of morphine and meperidine. In this test procedure, when the compounds of Formula I were administered prior to or simultaneously with administration of morphine or meperidine, the expected analgesic effect of the latter was decreased with increasing dosage levels of the former to a point where no analgesic effect was obtained. And when the new compounds were administered after the administration of morphine or meperidine, the anlagesic effect was diminished or terminated, depending on the dosage levels involved. For example representative compounds of this invention, each in the form of an aqueous solution of the lactic acid acid-addition salt, were administered subcutaneously to rats to determine the dosage level, in terms of weight of antagonists per kilogram of body weight of the animal, which caused reduction of the analgesic effect of a 60 mg./kg. dose of meperidine hydrochloride by approximately 50 percent or 15 mg./kg. dose of morphine sulfate, so that the analgesic effect produced by the combination of the antagonist and the meperidine hydrochloride or the morphine sulfate was substantially the same as the analgesic effect produced by a 30 mg./kg. dose of meperidine hydrochloride alone or 7.5 mg./kg. of morphine sulfate alone, respectively. Representative test results thus obtained were as follows:

| Compound of Example No. | Mg./kg. versus meperidine |
|---|---|
| 1(A) | 2.7 |
| 10(A) | 0.17 |
| 11 | 1.55 |
| 13(A) | 0.35 |
| 14 | 10.5 |
| 21(A) | 0.15 |

We claim:

1. 1,2,3,4,5,6-hexahydro-3-($Y^1$)-8-($Y^2$)-6,11-dimethyl-2,6-methano-3-benzazocine wherein $Y^1$ is 2- or 3-cyclopentenyl, lower alkyl-(2- or 3-cyclopentenyl), cyclopentenylmethyl, (lower alkyl-cyclopentenyl)methyl, or cyclopenty; and $Y^2$ is hydrogen, alkyl containing 1–4 carbon atoms, halo, trifluoromethyl, hydroxy, alkoxy containing 1–4 carbon atoms, methoxymethoxy, trihalomethoxy, alkanoyloxy containing 1–12 carbon atoms, cycloalkanecarbonyloxy containing 4–8 carbon atoms, pyridinecarbonyloxy, nitro, amino, alkanoylamino containing 1–12 carbon atoms, cycloalkanecarbonylamino containing 4–8 carbon atoms, pyridinecarbonylamino, or alkanesulfonamido containing 1–12 carbon atoms.

2. A compound according to claim 1 wherein $Y^1$ is 2- or 3-cyclopentenyl.

3. A compound according to claim 2 wherein $Y^2$ is hydroxy.

4. A compound according to claim 1 wherein $Y^2$ is hydrogen.

5. A compound according to claim 1 wherein $Y^2$ is halo.

6. A compound according to claim 3 wherein $Y^1$ is 2-cyclopentenyl.

7. A compound according to claim 3 wherein $Y^1$ is 3-cyclopentenyl.

8. A compound according to claim 1 wherein $Y^1$ is cyclopentenylmethyl.

9. A compound according to claim 8 wherein $Y^2$ is hydroxy.

10. A compound according to claim 8 wherein $Y^1$ is (1-cyclopentenyl)methyl.

11. A compound according to claim 1 wherein $Y^1$ is cyclopentyl.

12. A compound according to claim 11 wherein $Y^2$ is hydroxy.

References Cited

UNITED STATES PATENTS

| 3,372,165 | 3/1968 | Archer | 260—MORPHAN DIG. |
| 3,345,373 | 10/1967 | Gordon et al. | 260—MORPHAN DIG. |
| 3,480,638 | 11/1969 | Block et al. | 260—MORPHAN DIG. |
| 3,513,169 | 5/1970 | Robinson et al. | 260—MORPHAN DIG. |

HENRY R. JILES, Primary Examiner

S. D. WINTERS, Assistant Examiner

U.S. Cl. X.R.

260—DIG 13, 505 C, 648 C; 424—267

UNITED STATES PATENT AND TRADEMARK OFFICE
CERTIFICATE OF CORRECTION

PATENT NO. : 3,632,591
DATED : January 4, 1972
INVENTOR(S) : Noel F. Albertson and Sydney Archer It is certified that error appears in the above-identified patent and that said Letters Patent are hereby corrected as shown below:

Column 1, line 41, "cyclopentyimethyl," should read -- cyclopentylmethyl, --.

Column 2, lines 39-40, "cyclopentanecarbonylamino," should read -- cyclopropanecarbonylamino, --.

Column 2, lines 44-45, "alkanesulfonamid" should read -- alkanesulfonamido --.

Column 2, line 54, "or when" should read -- or, when --.

Column 2, line 69, "succimnamic" should read -- succinamic --.

Column 3, line 2, "salicyclic" should read -- salicylic --.

Column 4, line 24, "specis" should read -- species --.

Column 4, line 27, "ractions" should read -- reactions --.

Column 5, line 56, Example 3, "dimethyl 1 2,6-" should read -- dimethyl-2,6- --.

Column 5, line 69, Example 3, "(2-cyclopententyl)-" should read -- (2-cyclopentenyl)- --.

Column 6, lines 10-11, Example 3, "nicotinoylamido-" should read -- nicotinoylamino- --.

Column 6, line 57, Example 6, "-methane-" should read -- -methano- --.

UNITED STATES PATENT AND TRADEMARK OFFICE
CERTIFICATE OF CORRECTION

PATENT NO. : 3,632,591
DATED : January 4, 1972
INVENTOR(S) : Noel F. Albertson and Sydney Archer It is certified that error appears in the above-identified patent and that said Letters Patent are hereby corrected as shown below:

Column 7, line 14, Example 9, "-methanesulfonamide-" should read -- -methanesulfonamido- --.

Column 7, line 66, Example 10, "-cycloptentenyl)" should read -- -cyclopentenyl)- --.

Column 9, line 7, Example 13, "-8-acetoxytrans-" should read -- -8-acetoxy-trans- --.

Column 9, lines 44-45, Example 14, "-cyclopentenyl)-methyl]-8lhydroxy-" should read -- -cyclopentenyl)methyl]-8-hydroxy- --.

Column 10, line 15, Example 16, "-2,6-methane-" should read -- -2,6-methano- --.

Column 10, lines 18-19, Example 16, "(1-cyclo-pentenyl)methyl" should read -- (1-cyclopentenyl)methyl"--.

Column 10, line 38, Example 16, "isonicotincylamino-" should read -- isonicotinoylamino- --.

UNITED STATES PATENT OFFICE
CERTIFICATE OF CORRECTION

Patent No. 3,632,591            Dated January 4, 1972

Inventor(s) Noel F. Albertson et al.

It is certified that error appears in the above-identified patent and that said Letters Patent are hereby corrected as shown below:

Column 10, line 61, Example 18, "-,6-methane-" should read -- -2,6-methano- --.

Column 10, line 74, Example 20, "siimlar" should read -- similar --.

Column 13, lines 4-5, Claim 1, "cyclopenty;" should read -- cyclopentyl; --.

Signed and Sealed this

Fourteenth Day of June 1977

[SEAL]

Attest:

RUTH C. MASON
*Attesting Officer*

C. MARSHALL DANN
*Commissioner of Patents and Trademarks*